Figure 1:
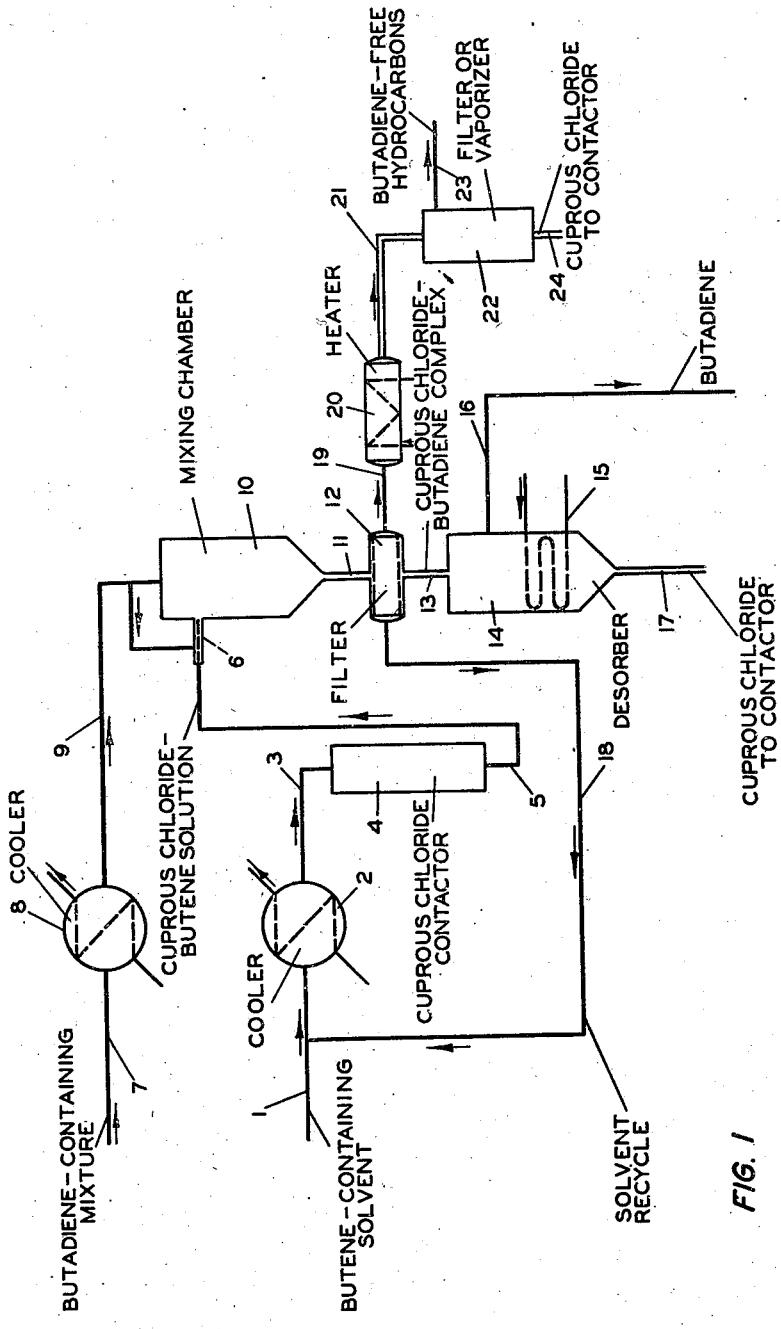

Patented Oct. 9, 1945

2,386,300

UNITED STATES PATENT OFFICE 2,386,300

PROCESS FOR TREATING HYDROCARBONS

Harry E. Drennan and Walter A. Schulze, Bartlesville, Okla., assignors to Phillips Petroleum Company, a corporation of Delaware Application November 7, 1941, Serial No. 418,262

12 Claims. (Cl. 260—681.5)

This invention relates to a process for the treatment of hydrocarbons containing olefins and diolefins for the production of diolefins therefrom. More specifically it relates to an improved process for the separation of diolefins from hydrocarbon mixtures containing the same and derived from the pyrolytic and/or catalytic treatment of petroleum fractions or suitable liquid or gaseous hydrocarbon stocks from any source.

The production of diolefins, for example butadiene, involves the production and/or segregation of complex hydrocarbon mixtures comprising said diolefins and the corresponding monoolefins and paraffins along with hydrocarbons of smaller and larger number of carbon atoms. The concentration of the desired diolefin in such a hydrocarbon mixture depends on the method of manufacture and on previous purifying or concentrating procedures and may vary over a wide range. Ordinarily it is not commercially feasible to separate out a pure diolefin by simple fractionation because of the closeness of the boiling points of the hydrocarbons associated therewith. Hence, solvent extraction, physical adsorption, or chemical reaction ar absorption are utilized. In general, the absorption of the desired diolefin from complex mixtures is dependent on the use of a process or a reagent of suitable specificity so that the final reaction product comprises substantially pure diolefin to the exclusion of the other components of the original mixture. Said final product may be a diolefin addition compound or the like which is sufficiently unstable to permit substantially complete diolefin recovery by convenient means.

Certain conjugated diolefins including butadiene react with cuprous halides, particularly the chloride and bromide, to form addition compounds from which the diolefin may be recovered. While this reaction is not entirely specific for diolefins, the use of aqueous solutions containing cuprous halides for the absorption of diolefins from hydrocarbon gases has been proposed. The aim of such processes is to form the cuprous halide-diolefin addition compounds and to separate the same from other components of the hydrocarbon mixture and the aqueous solution, and subsequently to recover the diolefin.

Some of the more outstanding disadvantages of processes utilizing aqueous cuprous halide solutions to separate diolefins are the concurrent formation of reaction products of carbon monoxide, acetylene and its homologues and various mono-olefinic hydrocarbons which may be present in a hydrocarbon mixture being treated. In the case of butadiene, a solid cuprous halide addition product relatively insoluble in the hydrocarbon and the aqueous medium is formed, and elaborate separation schemes have been proposed for separating this product from the aqueous solution and from contaminants prior to the liberation of the butadiene. The purity of the butadiene recovered is of course limited by the completeness of the separation.

There are other disadvantages accompanying the use of aqueous cuprous halide solutions aside from the non-specificity of said solutions. The cuprous halides are substantially water-insoluble, and solutizing agents such as hydrochloric acid, soluble chlorides or ammonia are necessary to prepare aqueous solutions. These cuprous solutions are extremely unstable toward oxygen or oxidizing agents which convert the reactive cuprous form to the cupric form. The cuprous salt solutions are highly corrosive toward ordinary iron or steel equipment, and must be handled in equipment fabricated from expensive alloys or substitutes such as wood, plastics or ceramic or rubber-lined metals. These factors all add to the cost and detract from the commercial applicability of processes utilizing aqueous cuprous salt solutions. Finally, low treating rates are essential to absorption of diolefins by aqueous immiscible liquids and plant equipment size is out of proportion to the actual diolefin absorbing capacity.

Accordingly, it is an object of this invention to provide an improved process for separating diolefins from hydrocarbon mixtures. It is another object of this invention to provide a process for absorbing diolefins from hydrocarbon mixtures which eliminates many of the disadvantages and operating difficulties previously associated with the use of aqueous cuprous halide solutions. Another object is to provide non-aqueous, hydrocarbon-miscible, non-corrosive solutions of cuprous halides for reacting with diolefins. A further object is to provide a continuous process whereby butadiene may be recovered in a substantially pure form from a butene-containing hydrocarbon mixture through the formation and subsequent decomposition of a cuprous halide complex, said cuprous halide being carried in a solvent which in certain instances may be substantially the same as that containing the diolefin. Other objects and advantages will become apparent hereinafter as the invention is disclosed in more detail.

The co-pending application of Walter A. Schulze and Lloyd C. Morris, Serial No. 418,264, filed of even date herewith, discloses novel cuprous halide solutions in olefinic hydrocarbon liquids for reacting with diolefins to form insoluble cuprous halide-diolefin complexes. The copending application of Schulze and Morris, Serial No. 418,263, filed of even date herewith, discloses a cyclic process, especially in conjunction with catalytic dehydrogenation processes, for the separation and recovery of diolefins by means of such cuprous halide solutions. The present invention discloses various methods of preparing and utilizing said novel cuprous halide solutions to separate and recover pure diolefins in continuous processes.

We have now devised processes whereby the solubility of cuprous chloride, for example, in hydrocarbon liquids containing olefins, is utilized to prepare reagent solutions for removing diolefins from hydrocarbon liquid mixtures. By our process the diolefin-cuprous chloride addition complex is precipitated and separated from the hydrocarbon liquid in substantially pure form by means of solutions of cuprous chloride in hydrocarbon liquid solvents comprising olefins. It will be understood that the invention is applicable to various hydrocarbon mixtures of either narrow or relatively wide boiling range and to other cuprous halides such as the bromide, and merely for the sake of simplicity it will now be described with especial reference to $C_4$ hydrocarbons and cuprous chloride.

It has been found that when a hydrocarbon liquid substantially free of butadiene but containing unsaturated hydrocarbons including butenes is brought into contact with reagents comprising solid cuprous chloride under suitable temperature conditions, appreciable amounts of cuprous chloride go into solution. The solvent action of the hydrocarbon liquid may be attributed to physical solubility or to the more likely circumstances of the formation of an olefin-cuprous chloride complex which differs from the diolefin-cuprous chloride complex in being relatively soluble in the hydrocarbon liquid.

It has been discovered that the cuprous chloride in solution, regardless of the exact mechanism by which it is dissolved in the above-mentioned hydrocarbon liquid, will react rapidly under the proper conditions when butadiene is added thereto to precipitate the insoluble butadiene-cuprous chloride complex. The butadiene complex may then be separated from the hydrocarbon liquid and the butadiene recovered from said complex in substantially pure form.

The solutions of cuprous chloride in said butene-containing hydrocarbon liquids are satisfactorily stable at the conditions employed in our process for the formation and removal of the butadiene-cuprous chloride complex. However, said solutions may be treated to recover cuprous chloride therefrom by convenient means such as vaporization of the solvent at ordinary or reduced pressures or by heating the solution to temperatures within or above a certain relatively critical range while maintaining the hydrocarbons in liquid phase. This temprature range may vary somewhat with the composition of the solvent and the halide used, but usually temperatures of 80 to 140° F. are adequate to cause a fairly complete precipitation of cuprous chloride from liquid hydrocarbon solvents comprising butenes. The stability and concentration of said solutions is not greatly affected by pressure as long as no vaporization of the hydrocarbon occurs.

In one specific embodiment of our invention a substantially butadiene-free hydrocarbon liquid containing a considerable amount of butenes is passed at suitable reduced temperatures and at a satisfactory flow rate in contact with cuprous chloride in a finely-divided or powdered form. The reaction and/or solution of cuprous chloride then occurs to produce a solution of cuprous chloride. This solution is injected by means providing adequate mixing into a stream of another hydrocarbon liquid containing butadiene, and the insoluble butadiene-cuprous chloride complex is precipitated. The volume ratios of the liquids thus mixed may be controlled to provide exact quantities of cuprous chloride necessary for complete reaction with the butadiene, or if desired, a moderate excess of cuprous chloride may be added. The solid precipitate comprising the butadiene-cuprous chloride product may be separated by means such as filtration, coagulation, mechanical adsorption or the like, and the butadiene-free liquid may then be passed to subsequent processing operations. The separated solid butadiene complex free of uncombined liquid hydrocarbons is then passed to a heating zone wherein, by maintaining suitable temperatures, the butadiene is released and taken off. The cuprous chloride remaining in the heating zone may be returned, if desired, to the zone of original contact with the butenes-containing liquid and a continuous process is thus obtained.

The hydrocarbon liquid from which the butadiene has been extracted, following the separation of the butadiene-cuprous chloride addition complex, may be returned to the processing steps for the manufacture of additional quantities of butadiene, or if desired a portion of the stream may be recycled to the cuprous chloride contacting zone for further service as a solvent for cuprous chloride in the precipitation of the butadiene complex.

Figure 2:
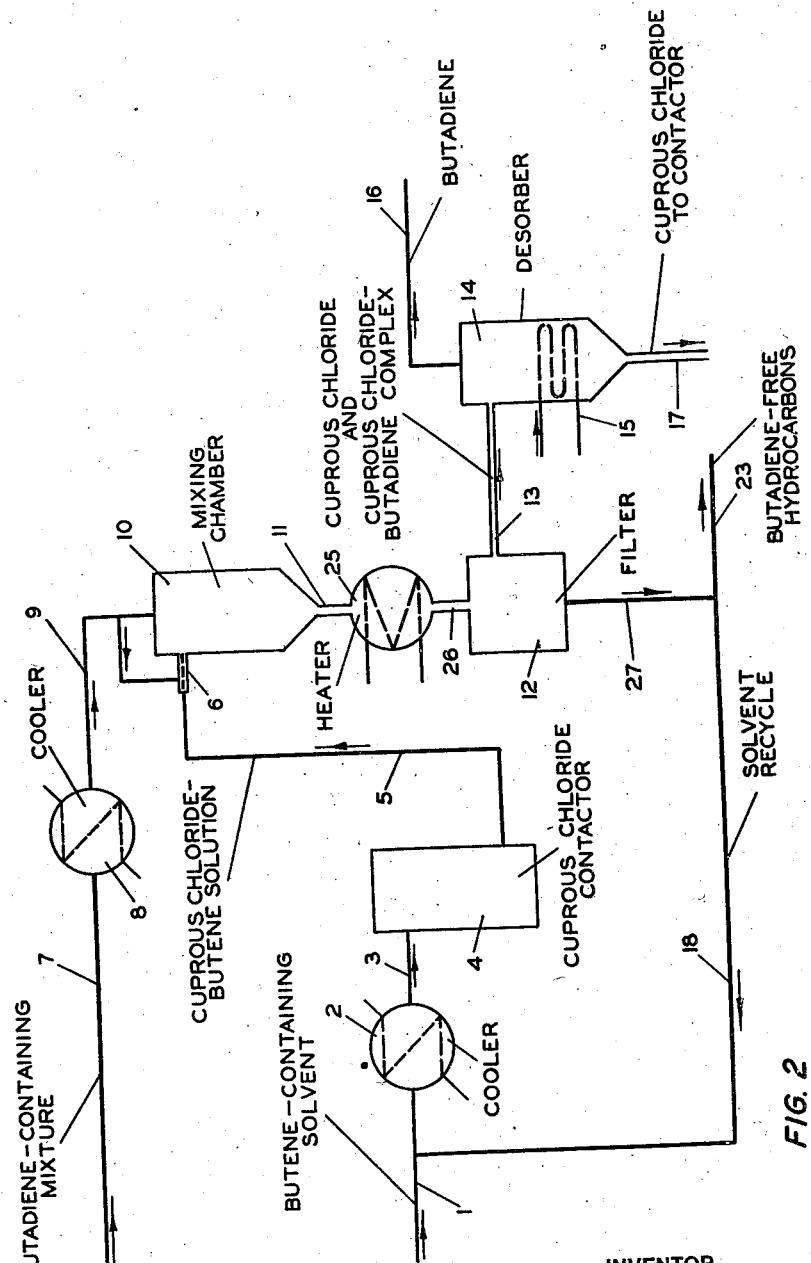

Our process may be more fully illustrated by the following detailed description, taken in conjunction with the drawings, of which Figure 1 is a flow diagram showing one arrangement of equipment for carrying out the production of diolefins from a hydrocarbon mixture containing the same, and Figure 2 is a similar flow diagram showing an alternate arrangement.

In Figure 1, the hydrocarbon liquid stream containing butenes which is to serve as solvent for the cuprous chloride enters by line 1 and after cooling to a suitable temperature in cooler 2, it passes through line 3 into the cuprous chloride contactor 4. In this contactor the butenes solvent stream is intimately mixed with cuprous chloride under conditions of temperature and contact time which promote the solution of the inorganic salt. The solution of cuprous chloride leaves the contactor by line 5 and passes to the mixing device 6 where the butadiene-containing stream is introduced. This stream enters the system by line 7 and after a desired degree of cooling in the unit 8 passes through line 9 to the mixing device 6 and/or directly into the mixing chamber 10. The commingled streams undergo further mixing and reaction in vessel 10, and the solid reaction product of butadiene and cuprous chloride is formed therein. The entire mixture then passes through line 11 into filter 12 or its equivalent. The substantially solid-free hydrocarbon liquid is removed by lines 18 and/or 19, while the separated solid passes through line 13 into desorbing chamber 14, which is equipped with a heating coil 15, or its equivalent. The solid material is there heated, and the butadiene released is taken off by line 16, while the cuprous chloride residue is removed through line 17 and may be returned by suitable means (not shown) to the contactor 4.

The liquid filtrate passing through line 18 may be recycled as solvent to the cuprous chloride contactor without further treatment. In fact, when the butadiene-containing stream contains an adequate concentration of butenes, the entire solvent requirement for the process may be provided by recycling of the necessary volume of said stream substantially freed of butadiene through line 18.

The portion of the filtrate which is being withdrawn from the system through line 19 may be passed through heater 20 wherein the temperature is raised to a level which causes precipitation of most of the dissolved cuprous chloride. The heated mixture is then passed through line 21 to a filter 22, or its equivalent, where the cuprous chloride is removed from the liquid hydrocarbon which exits through line 23. Instead of a filter as indicated by vessel 22, this vessel may serve as a vaporizer or flash-chamber wherein the hydrocarbon liquid may be allowed to vaporize and exit through line 23 with consequent deposition of any dissolved cuprous chloride, which is removed through line 24 and may be returned to the contactor 4 along with cuprous chloride from line 17. The hydrocarbon stream from which butadiene has been removed may be taken as a liquid or as a vapor to further processing steps as desired.

The pressure on the system at different points will vary according to the composition of the hydrocarbons being treated, the degrees of cooling and heating which take place, etc. and are regulated in well known manner by compressors and valves, not shown in the drawings, so as to keep the materials in liquid phase except in the final steps of the process where vaporization is desired.

Figure 2 illustrates another adaptation of our process wherein the separation of the solid material comprising both the cuprous chloride-diolefin complex and any unreacted cuprous chloride from the hydrocarbon liquid is accomplished by filtration or the like in a single step. In Figure 2, the hydrocarbon solvent stream containing butenes enters by line 1, and after suitable reduction in temperature in cooler 2, it passes through line 3 into cuprous chloride contactor 4 wherein the butenes solution of cuprous chloride is prepared. The stream then passes through line 5 into mixing device 6 where the butadiene-containing stream is added. This latter stream enters the system by line 7, and is cooled in cooler 8 before passing through line 9 to the mixing device 6 and/or to the mixing chamber 10. The commingled streams undergo further mixing and reaction in chamber 10 to complete the formation of the butadiene addition product. The suspension of solid addition product in the butenes and other hydrocarbons passes from chamber 10 by means of line 11 into heater 25 wherein the temperature is raised sufficiently to precipitate substantially completely any excess of cuprous chloride from the hydrocarbon solvent, but without decomposing the butadiene addition complex. The suspension then passes through line 26 into filter 12 or its equivalent where the total solid material is separated from the liquid filtrate, which passes out through line 27 and may be taken from the system through line 23 or recycled in the desired amounts through line 18 to the solvent stream in line 1 ahead of the cuprous chloride contactor.

The solid material comprising cuprous chloride plus the butadiene-cuprous chloride complex, is passed from the filter 12 through suitable conveying means 13 to desorbing chamber 14, where heat is supplied by steam coil 15 or other means to decompose the butadiene addition complex and release butadiene which is removed through line 16. The cuprous chloride residue is then removed from chamber 14 through line 17 and may be returned to the contactor 4 for further service in the process. Pressures are regulated as mentioned with reference to Figure 1.

While the above-described illustrative diagrams show a semi-continuous type of operation it will be obvious that by the provision of suitable equipment the process may be made continuous. Thus by the duplication of the necessary elements of the equipment indicated, or of obvious modifications thereof, the separation of butadiene and the re-use of the cuprous chloride and/or the butenes solvent may be readily devised to give a continuous process. All such modifications and extensions of our process are considered within the scope and teachings of our invention.

In the preparation of the cuprous chloride solution in the olefinic substantially butadiene-free hydrocarbon solvent we prefer to use contact times and temperatures which yield essentially saturated solutions and to mix the solutions thus prepared in the proper proportions to react with and remove the available butadiene in the butadiene-containing stream. The proportioning of the two streams prior to mixing is more easily regulated if the cuprous chloride content of the solvent liquid is essentially constant. In this manner minor fluctuations in the butadiene content of the butadiene-containing stream may be handled without involving the circulation of excessive volumes of the solvent liquid.

The weight of cuprous chloride dissolved in the solvent stream will vary to some extent with the temperature in the contacting zone, the contact time, the physical condition of the inorganic salt and the olefin content of the hydrocarbon solvent. In any case, proper regulation of the volume proportions of the cuprous chloride precipitant solution and the butadiene-containing stream will be a matter of adjustment of the process equipment according to the terms of our disclosure.

We have found that maximum solubility of cuprous chloride in butenes is obtained at temperatures within the range of about 10 to 60° F., and we regulate the temperature of the cuprous chloride contacting zone accordingly. At higher temperatures decomposition of the olefin-cuprous chloride complex may be encountered, while very much lower temperatures decrease the solubility of cuprous chloride. Temperatures within the range of −30 to +70° F. are operative, but for economic reasons involving the cost of heating and cooling large volumes of hydrocarbon liquids we prefer to use the upper part of the range. In this way the temperature levels required for the various steps of the process are brought closer together.

In the contacting zone we prefer to use finely-divided or powdered cuprous chloride to insure rapid solution. However, many forms of the salt are useful if flow rates of the solvent are adjusted accordingly. The cuprous chloride may be used as the pure salt, or various methods of contacting such as dispersion of the salt on inert carriers or dispersing agents may be employed. Often methods of increasing the effective surface area of the cuprous salt exposed to the solvent liquid are helpful. Flow rates of solvent liquid through the contacting zone of 0.5 to 5 liquid volumes of hydrocarbon liquid per hour per volume of cuprous chloride are effective, although higher or lower flow rates may be employed.

The butenes-containing liquid solvent in our process may comprise mixtures of the pure compounds from any suitable source, or the liquid may comprise a mixture of paraffinic and olefinic hydrocarbons such as is ordinarily produced by or derived from the thermal and/or catalytic treatment of normally gaseous hydrocarbons of two to six or more carbon atoms. The boiling range of the solvent liquid may be adjusted by means such as fractionation to correspond to the desired degree of purity of the butenes fraction. For example a fraction comprising substantially only $C_4$ hydrocarbons may be segregated or the solvent may contain also hydrocarbons of smaller and/or larger number of carbon atoms. The presence of lower-boiling mono-olefins as ethylene, propylene and the like causes only minor increases in the amount of cuprous chloride dissolved in a solvent liquid, and such components in appreciable quantity are not always desirable in our process because of increased pressures necessary to maintain the hydrocarbons in liquid phase.

As disclosed in the first-mentioned co-pending application of Schulze and Morris, there are great differences in the solvent capacity of the various olefins for cuprous chloride. Butene-1, normal pentenes, and hexene-1 are the prefered solvents. For example, butene-1 is a much more desirable solvent than butene-2. Therefore, segregation of a butene solvent rich in butene-1 will reduce the volume of solvent required for the treatment of a given diolefin-containing liquid. However, the cost of the segregation steps must be weighed against the advantages of increased solvent power, and the optimum solvent in any particular case will depend upon the available hydrocarbon streams containing olefins, and the economic factors involved. In any case, the solvent capacity of the liquid solvent is based on the content of the various olefins present therein, the paraffinic hydrocarbons being substantially inert with respect to any solvent action on cuprous halides.

Since diolefins are frequently produced in admixture with other hydrocarbons, certain methods of segregating preferred olefins as solvents may sometimes be applied with advantage to such mixtures. For example, when butenes are catalytically dehydrogenated to butadiene, as exemplified by the disclosure of co-pending application of Schulze, Hillyer, and Drennan, Serial No. 412,637, filed September 27, 1941, which issued as Patent No. 2,367,623 on January 16, 1945, a $C_4$ mixture is produced containing both butene-1 and butene-2 along with butadiene. This mixture may conveniently be fractionated to give overhead a mixture of butadiene and butene-1, whose boiling points are quite close together, and the butenes-2 will be taken off as a kettle product and returned for further dehydrogenation. The butadiene-butene-1 mixture thus prepared may be used as the butadiene-containing mixture of our process, the butene-1 being recycled through the process as solvent for cuprous chloride offering maximum solubility for the cuprous chloride. As mentioned before, the extent to which such a segregation of a preferred solvent should be practiced will depend upon various economic considerations.

The reaction between the butadiene-containing hydrocarbon liquid and the solution of cuprous chloride in the hydrocarbon liquid solvent is promoted by intimate mixing of the two streams at relatively low temperatures which permit formation of the solid butadiene-cuprous chloride complex and which insure extremely low solubility of this complex in the hydrocarbon liquids. Thus the butadiene-containing stream may be cooled to temperatures corresponding to those of the stream from the cuprous chloride contacting zone, or higher or lower temperatures may be established for the butadiene-containing stream to raise or lower the temperature of the mixture within the limits previously mentioned. In general, the temperatures within the mixing zone are in the range of 10 to 60° F. although higher or lower values may be used approaching the temperatures which cause appreciable precipitation of cuprous chloride from the solvent stream. The rate of formation of the butadiene-cuprous chloride complex is satisfactory at temperatures of −30 to +80° F., although a narrower range of about 10 to 60° F. is ordinarily preferred.

When the precipitation of the solid butadiene-cuprous chloride complex is complete any excess of unreacted cuprous chloride is ordinarily still dissolved in the liquid hydrocarbons. If the streams have been properly proportioned ahead of the mixing chamber this amount of unreacted cuprous chloride will be small although a definite excess is desirable in treating streams containing relatively small concentrations of butadiene of the order of 1 to 20 weight per cent.

A separation step is required to separate the solid butadiene-cuprous chloride complex from the hydrocarbon liquid. This separation must be efficient to avoid the inclusion of hydrocarbons with the solid material from which butadiene is to be recovered and to prevent loss of the butadiene complex in the outgoing liquid stream. Several mechanical separation methods are possible including filtration, centrifuging and the use of an immiscible liquid coagulant. Any method which produces the desired degree of separation is satisfactory for our process, provided the necessary basic operating conditions disclosed are not essentially altered. In separating the solid material from the hydrocarbon liquid, certain liquid coagulants, immiscible with the hydrocarbon liquid may be used.

The solid cuprous chloride-butadiene complex, following its separation from the hydrocarbon liquid, is removed to a suitable heating zone where the temperature is raised to cause the decomposition of the complex. Temperatures of 140 to 210° F. and higher are satisfactory for this operation. Other methods of promoting the evolution of butadiene may be employed such as maintenance of subatmospheric pressures within the desorption chamber and the butadiene collection system. Lower desorption temperatures within the specified range may be employed in conjunction with subatmospheric pressures.

With regard to the cuprous chloride which may remain dissolved in the hydrocarbon liquid subsequent to the reaction with the diolefin, several alternative removal or purifying procedures are satisfactory. Thus, the cuprous chloride may be separated along with the diolefin addition complex by an intermediate heating step as illustrated in Figure 2. However, in case a portion of the hydrocarbon mixture is to be recycled as solvent, it is often quite satisfactory to leave dissolved cuprous chloride in said recycled portion of the liquid. In such an arrangement, the removal of excess cuprous chloride is deferred until the liquid filtrate stream is divided as illustrated in Figure 1.

The removal of dissolved cuprous chloride from the effluent liquid is often mandatory prior to most subsequent processing steps to which such a liquid would be fed. This purification of the hydrocarbon mixture may be accomplished by the steps of heating and filtering or vaporizing the hydrocarbon to deposit the inorganic salt. Still another method of purifying the liquid effluent is to treat same with an inorganic reagent capable of forming a suitably insoluble copper salt as explained in co-pending application of Walter A. Schulze, Serial No. 355,257, filed September 3, 1940.

The hydrocarbon effluent may be taken to further processing steps including dehydrogenation, polymerization and the like, wherein the olefin content may be utilized in the production of additional butadiene or of higher boiling hydrocarbons. As has been indicated, a portion of this stream may be recycled to our process to serve as the solvent for cuprous chloride in the further separation of butadiene. Since the butadiene-containing stream ordinarily contains appreciable quantities of butenes, the effective butenes concentration of this solvent is often not greatly altered by recycling of the effluent mixture from the process. On the contrary, the butenes content of the butadiene-containing stream may be great enough to furnish sufficient solvent capacity for our process without the addition of butenes from an outside source. In this case, the solvent stream is entirely derived from recycle of the butadiene-free liquid effluent from the process.

The hydrocarbon liquids to be treated for the removal of butadiene by our process may be more or less narrow boiling-range fractions, usually comprising $C_3$ and $C_4$ hydrocarbons, and containing from about 1 to 50 or more per cent by weight of butadiene. The required weight of cuprous chloride and hence the proportionate volume of cuprous chloride solution to be introduced in our process is determined by the butadiene content of the particular mixture being treated. The basis for calculation is the formation of an addition complex having the formula $(CuCl)_2 \cdot C_4H_6$ or two formula weights of cuprous chloride per formula weight of diolefin. The necessary operating control of our process is thus based on factors which vary with specific applications but within the terms of the foregoing description.

In some cases when treating streams containing relatively high concentration of butadiene, two or more successive treatments by our process may be employed to facilitate operation of the process equipment and separation of the heavy precipitate. In such an arrangement of successive stages, the recycle of solvent liquid is restricted to those stages producing a substantially butadiene-free liquid effluent.

The following examples will further illustrate specific applications of the process to the removal of butadiene from liquid hydrocarbon mixtures.

Example I

A $C_4$ hydrocarbon fraction containing about 10 weight per cent of butadiene and 85 weight per cent of butenes, principally butene-1, was cooled to 35° F. and intimately mixed with a solution of cuprous chloride in the same hydrocarbon fraction from which butadiene had been previously removed by our process. The cuprous chloride solution was prepared by passing the substantially butadiene-free liquid at a temperature of 40° F. over solid cuprous chloride. The cuprous chloride solution and the butadiene-containing liquid were mixed in a volume ratio of 3.5 to 1 at an effective reaction temperature of 35° F.

The suspension was filtered and the clear liquid substantially free of butadiene was divided into two streams and a volume of liquid recycled to the cuprous chloride contactor equivalent to the volume of solvent liquid in the reaction mixture. The solid precipitate of butadiene complex was removed from the separating zone and heated to a temperature of 200° F. to release the butadiene. The portion of the liquid filtrate not recycled to the process was heated in a separate heating zone and allowed to vaporize. A small amount of cuprous chloride was deposited in the vaporizer.

Example II

A $C_3$—$C_4$ fraction produced by the dehydrogenation of $C_4$ hydrocarbons and containing 3 per cent by weight of butadiene was cooled to 45° F. and charged to our process as illustrated in Figure 2. The cuprous chloride solution was prepared by passing a liquid butadiene-free $C_3$—$C_4$ hydrocarbon fraction containing over 80 weight per cent of butene-1 through a bed of powdered cuprous chloride at a temperature of 30° F. and a flow rate of 0.5 volume of liquid per hour per volume of cuprous salt. The solution of cuprous chloride obtained was mixed with the butadiene-containing stream in a volume ratio of 1 to 1. The liquid streams were intimately mixed and following the precipitation of the solid butadiene-cuprous chloride complex the suspension was passed to a heating zone where the temperature was raised to about 120° F. In the heating zone, the excess cuprous chloride separated from the hydrocarbon liquid.

The suspension was then filtered under pressure, and the clear liquid free of butadiene was divided into two streams according to the original volume ratio of mixing, and the solvent stream was recycled to the cuprous chloride contacting zone.

The solid material substantially free of hydrocarbons was removed from the filter and passed to a heating zone where butadiene was released by heating to a temperature of 190° F. The butadiene collected was 98 per cent pure. The cuprous chloride residue was returned to the contacting zone.

While the foregoing examples are specific illustrations of our process, many obvious and subsidiary modifications will be apparent from our disclosure, and no limitations are implied.

The terms "solvent liquid" and "butenes-containing liquid" which appear in the foregoing disclosure embrace any hydrocarbon liquids containing sufficient concentrations of butenes to be useful in our process. Furthermore, other olefins such as propylene, pentenes, etc. may be used as solvent liquids when desired in place of butenes for the separation of butadiene and other diolefins. Said solvents should be essentially free of diolefins to prevent the formation of the diolefin-cuprous halide complex ahead of the mixing or reaction zone since difficulty might be experienced thereby in the mechanical operation of the process and in recovery of the diolefin. The liquid hydrocarbon stream from the cuprous halide contactor should be essentially free of suspended solids, although in some instances, minor amounts of suspended cuprous chloride might be tolerated.

Hydrocarbons containing triple-bond linkages may be removed from mixtures prior to treatment by the described process, if desired. Any widening of the boiling range of the materials being treated by our process such as by the inclusion of higher-boiling hydrocarbons or miscible liquids of any nature in our solvent liquid to enhance the solvent capacity thereof may be corrected, if desirable, by re-fractionation of the unrecycled liquid effluent from our process. If required, the solvent recycle stream may undergo fractionation or other treatment to segregate a preferred solvent from the other components of the diolefin-free hydrocarbon stream.

While the foregoing is relatively specific to the treatment of butadiene-containing liquid hydrocarbons, with necessary modifications the process may be applied to the separation of conjugated diolefins of five or more carbon atoms. Such modifications include the use of butenes as well as olefins of five or more carbon atoms as solvents according to our invention.

We claim:

1. A process for separating diolefins from a mixture containing the same which comprises contacting an olefin-containing liquid with a cuprous halide in a first zone to form a solution of said cuprous halide, contacting said solution in a subsequent zone with a diolefin-containing mixture to separate diolefins as an insoluble addition compound with the cuprous halide, separating said addition compound from the diolefin-free olefin-containing liquid, recovering diolefins from said addition compound, and recycling to said first zone a portion of said diolefin-free olefin-containing liquid as solvent.

2. A process for separating diolefins from a mixture containing the same which comprises contacting an olefin-containing liquid with cuprous chloride in a first zone to form a solution of said cuprous chloride, contacting said solution in a subsequent zone with a diolefin-containing mixture to separate diolefins as an insoluble addition compound with the cuprous chloride, separating said addition compound from the diolefin-free olefin-containing liquid, recovering diolefins from said addition compound, and recycling to said first zone a portion of said diolefin-free olefin-containing liquid as solvent.

3. A process as in claim 2 in which at least a substantial proportion of the olefin-containing liquid consists of butene-1.

4. A process as in claim 2 in which at least a substantial proportion of the olefin-containing liquid consists of a normal pentene.

5. A process as in claim 2 in which at least a substantial proportion of the olefin-containing liquid consists of hexene-1.

6. A process for separating low-boiling aliphatic diolefins from a hydrocarbon mixture containing the same which comprises contacting an olefin-containing liquid with a cuprous halide in a first zone to form a solution of said cuprous halide, contacting said solution in a subsequent zone with said hydrocarbon mixture to separate diolefins as an insoluble addition compound with the cuprous halide, separating said addition compound from the diolefin-free olefin-containing liquid, heating said addition compound to liberate diolefins and cuprous halide, recycling to said first zone a portion of said diolefin-free olefin-containing liquid, heating the remainder of said liquid to liberate dissolved cuprous halide therefrom, and returning to said first zone the cuprous halide from both heating steps.

7. A process for the separation of a diolefin from a mixture containing the same which comprises passing into a mixing zone a stream of said mixture and a stream of a reagent comprising a solution of a cuprous halide-olefin complex in liquid hydrocarbons, thereby forming an insoluble cuprous halide-diolefin complex, heating the total effluents from said mixing zone to a temperature sufficient to decompose the remaining cuprous halide-olefin complex and precipitate cuprous halide therefrom but insufficient to decompose the cuprous halide-diolefin complex, separating the solids from the diolefin-free olefin-containing liquid, heating the solids to a temperature sufficient to decompose the cuprous halide-diolefin complex thereby producing substantially pure diolefin and cuprous halide, and contacting the cuprous halide with a portion of the diolefin-free olefin-containing hydrocarbon liquid for the formation of cuprous halide-olefin reagent.

8. A process for the separation of butadiene from a liquid hydrocarbon mixture containing the same together with butenes which comprises passing a stream of said liquid hydrocarbon mixture previously freed of butadiene by the said process over solid cuprous halide to effect solution of the cuprous halide, mixing the solution thus prepared with the butadiene-containing liquid whereby a reaction occurs to precipitate the butadiene as a solid cuprous halide addition product, separating the solid material from the hydrocarbon liquid by filtration, returning a portion of the butadiene-free hydrocarbon liquid filtrate to the zone of contact with solid cuprous halide, heating the remainder of said filtrate to remove dissolved cuprous halide therefrom, and finally heating said solid material substantially free of liquid hydrocarbons to a temperature sufficient to cause evolution of the butadiene and recovering same in substantially pure form.

9. A process for the separation of butadiene from a liquid hydrocarbon mixture containing the same which comprises contacting an olefin-containing hydrocarbon liquid with solid cuprous chloride at temperatures in the range of about $-30$ to $+80°$ F. to form a solution of cuprous chloride, mixing said solution with the butadiene-containing liquid hydrocarbon at temperatures in the range of about $-30$ to $+80°$ F. to form an insoluble butadiene-cuprous chloride complex, separating said complex from the butadiene-free olefin-containing liquid, recycling a portion of the butadiene-free olefin-containing liquid to contact with solid cuprous chloride, removing residual cuprous chloride from the remainder of said liquid, and recovering butadiene from said complex.

10. A process for the separation of butadiene from a liquid hydrocarbon mixture containing the same which comprises admixing with the butadiene-containing liquid at temperatures of about 10 to 60° F. a solution of cuprous chloride in a substantially butadiene-free hydrocarbon liquid solvent comprising butenes, precipitating a solid insoluble butadiene-cuprous chloride complex, heating the mixture subsequent to the substantial completion of the reaction to a temperature in the range of about 80 to 130° F., separating the liquid hydrocarbons from the solid precipitate consisting of the butadiene-cuprous chloride complex and cuprous chloride, and heating said solid precipitate at temperatures above about 140° F. to recover the butadiene.

11. A process for recovering butadiene from a C4 hydrocarbon mixture containing the same along with butene-1 and butenes-2 which comprises fractionating said mixture to produce a fraction comprising butene-1 and butadiene, mixing said fraction in the liquid phase with a solution of cuprous chloride in a hydrocarbon liquid comprising essentially butene-1 to precipitate an insoluble butadiene-cuprous chloride complex, separating said complex from the butadiene-free butene-1, recovering butadiene from said complex, contacting a portion of said butadiene-free butene-1 with cuprous chloride to form a solution of cuprous chloride therein, and mixing said solution with the butadiene-containing fraction for the further formation of butadiene-cuprous chloride complex.

12. A process for the separation of diolefins from a hydrocarbon mixture containing the same along with relatively low-boiling aliphatic olefins which comprises treating said mixture with an excess of a cuprous halide reagent consisting of a solution of cuprous halide in a hydrocarbon liquid comprising an aliphatic olefin to form a mixture comprising an insoluble cuprous halide-diolefin complex and a solution of excess cuprous halide in the diolefin-free unprecipitated hydrocarbon, separating said cuprous halide-diolefin complex from the remaining solution of cuprous halide in said diolefin-free unprecipitated hydrocarbon, decomposing said complex to recover said diolefin, heating said remaining solution to precipitate the dissolved cuprous halide therefrom, and removing said precipitated cuprous halide from the residual diolefin-free hydrocarbons.

HARRY E. DRENNAN.
WALTER A. SCHULZE.